Figure 1:
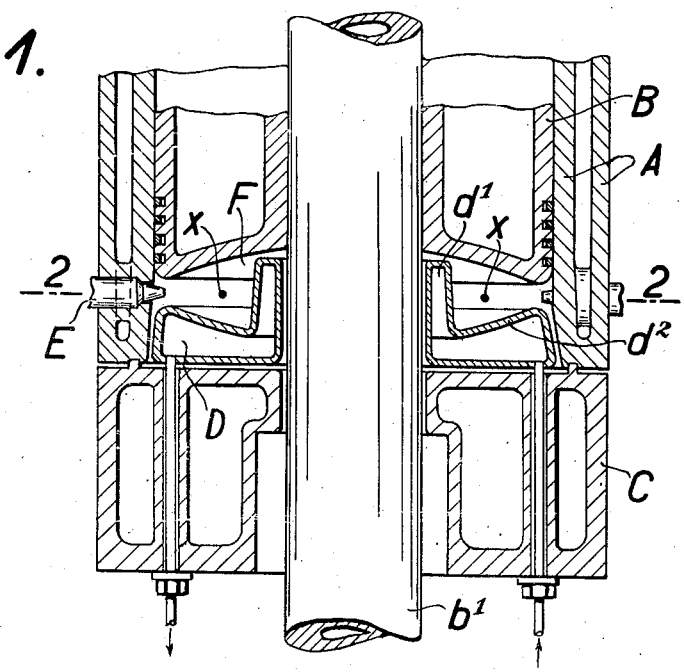

Oct. 18, 1927.  
E. HERKT  
1,645,595  
INTERNAL COMBUSTION ENGINE  
Filed March 1, 1926

Inventor  
Ernst Herkt

Patented Oct. 18, 1927.

1,645,595

UNITED STATES PATENT OFFICE.

ERNST HERKT, OF KIEL, GERMANY, ASSIGNOR TO FRIED. KRUPP GERMANIAWERFT AKTIENGESELLSCHAFT, OF KIEL GAARDEN, GERMANY.

INTERNAL-COMBUSTION ENGINE.

Application filed March 1, 1926, Serial No. 91,607, and in Germany March 3, 1925.

The invention relates to double-acting internal combustion engines the cylinder covers of which are fitted with inside heat-protecting chambers, fed with cooling water. With double-acting engines of this kind that portion of the piston rod which works within the combustion room is exposed to extraordinarily high heat strengths, during the fuel-injecting and combustion period, causing the piston rod to soon be corroded and thus provoking serious breakdowns of the engine.

Now the object of my invention is to have an internal combustion engine of the character stated in which this draw-back is obviated, this object being attained according to my invention, by the fact that said inside cooling chamber of the piston rod side of the working cylinder has an angular cross section and projects up almost to the surface of the piston when the latter takes the lower dead center position, said cooling chamber thus completely surrounding the piston rod in the range of the combustion room.

A preferred embodiment of my invention is illustrated by way of example in the drawing which accompanies and forms part of this specification.

Figure 2:
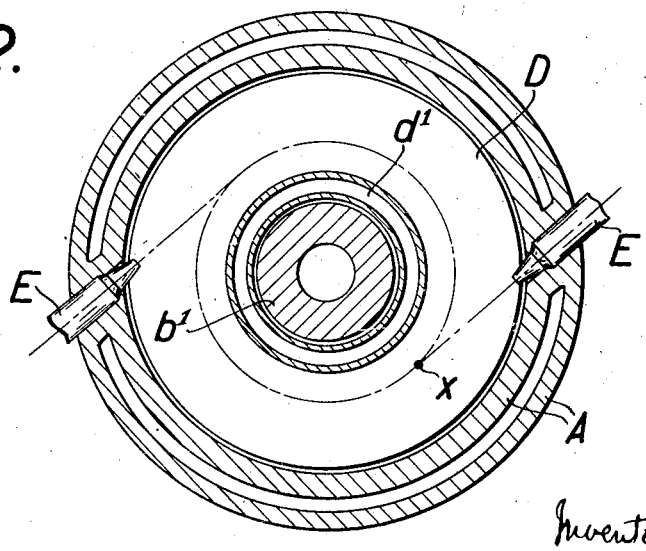

In this drawing:

Fig. 1 is a fragmentary longitudinal section through the working cylinder of a double-acting internal combustion engine, Fig. 2 is a cross section taken on line 2—2 of Fig. 1.

A denotes the working cylinder of the engine, B the piston and C the cylinder cover entering into consideration. This cover C is provided with an inside heat protectng chamber D, the piston rod $b^1$ passing both through cover C and water chamber D. In accordance with my invention the inner portion $d^1$ of chamber D is bent upwardly so as to reach almost up to the piston B, when it takes its lower dead center position. The flat bottom portion $d^2$, turned to the combustion room, of chamber D is of concave shape like the opposite surface of the piston B so that an annular combustion room F of lens-shaped cross section is formed between concave portion $d^2$ and extension $d^1$ of chamber D and piston B.

Two fuel injecting valves E extend into the combustion room F. They are directed so that their axes touch the circle X of the center of gravity of said room.

The described configuration of the water chamber D results in a very efficient protection of the piston rod $b^1$, as it is completely protected against the noxious effect of the hot combustion gases when the piston takes its lower dead center position. Furthermore, the thin flames ejected from the injecting valves are not able to strike both the piston rod and the extension $d^1$, surrounding it, of chamber D.

By arranging the injecting valves so as to cause the fuel jets to touch the center of gravity circle X of the combustion room, a uniform charging of the whole annular space F with fuel and a satisfying combustion is ensured.

It may still be noted that the combination of an annular combustion room with inclined fuel injecting nozzles is already known per se in double-acting internal combustion engines.

What I claim is:

1. A double-acting internal combustion engine having a cooling chamber arranged inside the cover of the piston rod side of the working cylinder, said chamber having an angular cross section, one leg of it surrounding the piston rod and extending almost up to the surface of the piston in its lower dead center position.

2. A double-acting internal combustion engine having a cooling chamber arranged inside the cover of the piston rod side of the working cylinder, said chamber having an angular cross section, one leg of it surrounding the piston rod and extending almost up to the surface of the piston in its lower dead center position, the other leg and said piston having their opposite surfaces of concave shape so as to form a combustion room of lens-shaped cross section.

The foregoing specification signed at Hamburg, Germany, this third day of February, 1926.

ERNST HERKT.